(12) United States Patent
Chatzigrigoriou et al.

(10) Patent No.: US 12,162,306 B2
(45) Date of Patent: Dec. 10, 2024

(54) SELF-HEALING SEAL ASSEMBLY FOR A WRITING INSTRUMENT

(71) Applicants: SOCIÉTÉ BIC, Clichy (FR); BIC Violex Single Member S.A., Anoixi (GR)

(72) Inventors: Nikolaos Chatzigrigoriou, Anoixi (GR); Christos Kerosis, Anoixi (GR); Polykarpos Psaropoulos, Anoixi (GR); Georgios Katsikas, Anoixi (GR); Arnaud Bez, Clichy (FR)

(73) Assignees: SOCIETE BIC, Clichy (FR); BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/565,465

(22) PCT Filed: May 30, 2022

(86) PCT No.: PCT/EP2022/064521
§ 371 (c)(1),
(2) Date: Nov. 29, 2023

(87) PCT Pub. No.: WO2022/253721
PCT Pub. Date: Dec. 8, 2022

(65) Prior Publication Data
US 2024/0253388 A1  Aug. 1, 2024

(30) Foreign Application Priority Data

May 31, 2021  (EP) ..................... 21305720

(51) Int. Cl.
B43K 5/17  (2006.01)
B29C 73/20  (2006.01)
B43K 8/02  (2006.01)

(52) U.S. Cl.
CPC ............... *B43K 5/17* (2013.01); *B29C 73/20* (2013.01); *B43K 8/028* (2013.01)

(58) Field of Classification Search
CPC . B43K 5/17; B43K 8/028; B43K 5/16; B43K 8/02; B43K 23/08; B43K 23/12; B29C 73/20
USPC .................................................. 401/107, 108
See application file for complete search history.

(56) References Cited

U.S. PATENT DOCUMENTS

| | | | |
|---|---|---|---|
| 5,022,773 A | * | 6/1991 | Waldinger ............... B43K 7/12 401/59 |
| 6,213,661 B1 | | 4/2001 | Coon |
| 7,101,102 B2 | | 9/2006 | Sawa |
| 7,252,449 B2 | | 8/2007 | Carroll et al. |

(Continued)

FOREIGN PATENT DOCUMENTS

| | | |
|---|---|---|
| GB | 2409437 A | 2/2006 |
| WO | 2008094376 A1 | 8/2008 |
| WO | 2013140092 A1 | 9/2013 |

OTHER PUBLICATIONS

Search Report and Written Opinion issued in International Application No. PCT/EP2022/064521, mailed Aug. 29, 2022.

*Primary Examiner* — David J Walczak
(74) *Attorney, Agent, or Firm* — Bookoff McAndrews, PLLC

(57) ABSTRACT

A writing instrument comprising a self-healing seal component to prevent drying out of the writing instrument and an elastomeric support to protect the self-healing seal component.

20 Claims, 4 Drawing Sheets

(56) References Cited

U.S. PATENT DOCUMENTS 7,255,507 B2 8/2007 Lammers et al.
2005/0191111 A1* 9/2005 Carroll ................ B43K 24/084
401/111

* cited by examiner

SELF-HEALING SEAL ASSEMBLY FOR A WRITING INSTRUMENT

CROSS REFERENCE TO RELATED APPLICATION

This is a National Stage Application under 35 U.S.C. § 371 of International Application No. PCT/EP2022/064521, filed May 30, 2022, now published as WO 2022/253721 A1, which claims priority to European patent application EP 21305720.1, filed May 31, 2021, its content being incorporated herein by reference.

TECHNICAL FIELD

The present disclosure relates to the field of writing devices. More specifically, the present disclosure relates to writing devices that dispense volatile inks, such as felt tip markers and the like.

BACKGROUND

The present disclosure relates to writing instruments that dispense volatile inks, such as felt tip markers, highlighter, non-permanent and permanent markers, and the like. Commonly, felt pens comprise a writing tip in the form of a nib and a cap to close off the nib. The nib is typically kept wet by the ink used for writing. Closing of the nib may be necessary to prevent the solvents of the ink from evaporating which would lead to the nib drying out within a few hours. A dried out nib may impair the writing quality of the nib or render the entire felt pen irreversibly useless. Further, an uncovered nib can lead to unintentional stains on surfaces, e.g. clothes or skin of the user. Also, it may be tedious for the user to recap a felt pen after every use, especially when drawing with multiple colors. Further, a cap may be displaced leading to the nib drying out.

More recently, retractable felt pens have been developed. However, such retractable felt pens may require a sealing chamber which needs to comprise a complex mechanism to open and close every time the nib is slid in or out. A solution to this may be the use of self-healing films that prevent evaporation of solvents when the nib is in its retracted position. When the nib is moved to the extended position the self-healing film may be penetrated. Subsequently, when the nib moves back to its retracted position the self-healing film may reseal the sealing chamber without the need for a complex mechanism.

However, it has been found that the self-healing film may interact with the nib during every extension and retraction. This interaction may lead to a material build-up at the penetration site of the self-healing material. This material build-up may in turn lead to a system failure as it may block the nib from moving or may lead to a seal failure.

The present disclosure aims to address one or more problems in the prior art.

SUMMARY

In a first aspect, the present disclosure relates to a writing instrument comprising a tubular body. The tubular body may terminate in a writing orifice at the distal end of the tubular body. It should be understood that when the present disclosure refers to the distal end as the end comprising the end utilized for dispensing the ink of the writing instruments. Accordingly, the proximal end is the end of the writing instrument which is opposite to the distal end. The same applies to the proximal and distal ends of the tubular body. The writing instrument may further comprise a reservoir for storing a writing ink. The reservoir may be arranged proximally to the writing orifice.

The writing instrument may further comprise a nib which may be arranged distally to the reservoir. The nib may be in fluid communication with the reservoir. The nib may be configured to be axially translatable within the tubular body between a first retracted position in which the nib is positioned within the tubular body and not protruding through the writing orifice and a second extended position in which the nib protrudes through the writing orifice.

The writing instrument may further comprise an actuating means for axially translating the nib within the tubular body between the first retracted position and the second extended position. The second extended position may be the position for writing, i.e., a position in which the nib protrudes sufficiently through the writing orifice to be able to dispense ink when used by the user.

The writing instrument may further comprise a seal assembly. The seal assembly may comprise a seal component. The seal component may be located within the tubular body at or adjacent to the writing orifice. The seal component may seal the nib and the reservoir from exposure to the environment in the first retracted position. The seal component may be configured to be penetrated when the nib is advanced into the second extended position for writing. The seal component may comprise a self-healing material. The seal component may be configured to at least partially restore its sealing property when the nib is retracted to the first retracted position.

The seal assembly may comprise at least one elastomeric support. The at least one elastomeric support may be configured to prevent dragging of the self-healing material during the nib movement. The term "dragging" within this disclosure shall refer to a process wherein an object is translated while being in contact with a second object, in particular a second object comprising an elastic material, and wherein due to frictional forces between the surfaces of the first and second object, at least part of the material of the second object is dislocated. In particular during the dragging process, the second material may be dislocated in a way that it does not return to its former location after first object is translated an equal amount into the opposite direction.

In embodiments, the self-healing material may be placed adjacent to at least one of the at least one elastomeric supports.

In embodiments, at least one of the at least one elastomeric supports may be placed distally of the nib in the first retracted position and axially translate simultaneously with the nib when the nib is advanced into the second extended position for writing, until the at least one elastomeric support is adjacent to the seal component.

In embodiments, at least one of the at least one elastomeric supports may have a thickness between about 0.1 mm to about 3 mm, more specifically between about 0.2 mm to about 2 mm and in particular between about 0.4 mm and about 1 mm.

In embodiments, at least one of the at least one elastomeric supports may have a shore A hardness between about 30 to about 90, more specifically between about 40 to about 80, and in particular between about 50 to about 70, measured according to ASTM D2240-15e1.

In embodiments, at least one of the at least one elastomeric supports may cover at least about 70%, more specifically at least about 80% and in particular at least about 90% of the surface area of at least one side of the self-healing material when the at least one elastomeric support is in a position adjacent to the self-healing material.

In embodiments, at least one of the at least one elastomeric supports may comprise one or more predetermined breaking points or lines.

In embodiments, at least one of the at least one elastomeric supports may comprise the one or more predetermined breaking points or lines in the form of a slot by a single straight or curved line.

In embodiments, at least one of the at least one elastomeric supports may comprise the one or more predetermined breaking points or lines or curves in the form of slots by multiple straight or curved lines, in particular multiple intersecting straight or curved lines.

In embodiments, the seal-assembly may comprise two elastomeric supports, wherein the self-healing material is placed between the two elastomeric supports, in particular wherein the self-healing material is placed between the two elastomeric supports along a proximal-distal axis. In other words, the self-healing material is sandwiched between the two elastomeric supports.

In embodiments, at least one of the at the one elastomeric supports may comprise a thermoplastic or a thermosetting elastomer, in particular one of styrenic block copolymers, thermoplastic polyolefineelastomers, thermoplastic polyurethanes, copolyesters, polyether block amides, thermoplastic vulcanizates or a silicone.

In embodiments, the self-healing material may be configured to be at least partially torn when the nib is advanced into the second extended position and to substantially close the tear by forming a continuous material when the nib is retracted to the first retracted position.

In embodiments, the self-healing material may form the continuous material by forming molecular bonds, in particular molecular bonds across the tear.

In embodiments, seal component may be torn by the nib or by a piercing mechanism when the nib is advanced into the second extended position for writing.

In embodiments, the seal component may be configured to at least partially restore its sealing property in less than about 12 hours, more specifically less than about 6 hours, and in particular less than about 3 hours.

In embodiments, the nib may be made of a fibrous or porous material.

In embodiments, the self-healing material may be selected from intrinsic self-healing materials or extrinsic self-healing materials.

In embodiments, the writing instrument may be a felt pen, a highlighter, or a permanent or non-permanent marker.

In embodiments, the seal component may fulfill its function for at least 200 cycles, more specifically at least 1000 cycles and in particular at least 2000 cycles.

In embodiments, the seal component may be disc-shaped.

In embodiments, at least one of the at least one elastomeric supports may be disc-shaped.

In embodiments, wherein the seal component may be bell-shaped.

In embodiments, at least one of the at least one elastomeric supports may be bell-shaped.

DETAILED DESCRIPTION

Hereinafter, a detailed description will be given of the present disclosure. The terms or words used in the description and the aspects of the present disclosure are not to be construed limiting as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Figure 1:
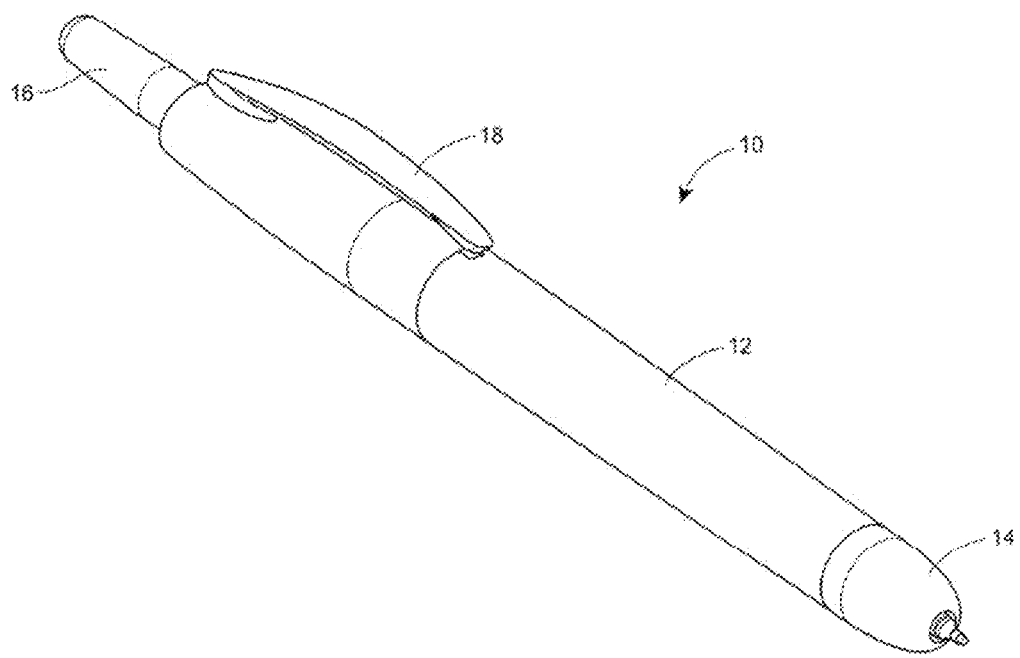
FIG. 1 shows an example of writing instrument according to the present disclosure.

In a first aspect, the present disclosure relates to a writing instrument. An example of a writing instrument according to the present disclosure is described below with reference to FIG. 1. The writing instrument (10) may comprise a tubular body (12, 14). The tubular body may be a unitary body, or it may comprise multiple components. In FIG. 1, the tubular component is made of multiple components and comprises a tip component (14) comprising a writing orifice which is located at the distal end of the tip component (14). The writing instrument (10) may further comprise a reservoir for storing a writing ink which may be arranged proximally to the writing orifice within or as part of the tubular body (12, 14). It is not shown in FIG. 1. The writing instrument (10) may further comprise a nib (24) which may be arranged distally to the reservoir. The nib (24) may be in fluid communication with the reservoir. In embodiments, the fluid communication may be established by a channel connecting the reservoir and the nib (24) or by the nib (24) comprising a fibrous or porous element which extends into the reservoir and is configured to transport ink from the reservoir to the nib (24).

The nib (24) may be configured to be axially translatable within the tubular body (12, 14) between a first retracted position in which the nib (24) is positioned within the tubular body (12, 14) and not protruding through the writing orifice and a second extended position in which the nib (24) protrudes through the writing orifice. The second extended position may be the position for writing, i.e., a position in which the nib (24) protrudes sufficiently through the writing orifice to be able to dispense ink when used by the user. In FIG. 1, the second extended position is shown in which the nib (24) protrudes through the writing orifice. The writing instrument may further comprise an actuating means for axially translating the nib (24) within the tubular body (12, 14) between the first retracted position and the second extended position. In the sense of the present disclosure, axial translation refers to a movement along the longitudinal axis of the tubular body (12, 14). The actuating means may comprise multiple components. In embodiments, the actuating means may comprise a push button (16) which is arranged at the distal end of the tubular body (12, 14). FIG. 1 further features a clip (18) for affixing the writing instrument (10) to a substrate such as a clip board or a pocket. In embodiments, the actuating means may comprise such a clip (18) which is then slidably or rotatably arranged at the distal end of the tubular body (12, 14) and configured to directly or indirectly axially translate the nib (24). In still other embodiments, the actuating means may be a circular element arranged on or in the tubular body (12, 14) which is configured to directly or indirectly axially translate the nib (24) by rotating or sliding the circular element. In embodiments, a spring may be arranged inside or outside the tubular body (12, 14), in particular to provide a means for reversing the axial translation provided by the actuating means. In embodiments, the writing instrument (10) may further comprise a spring for axially translating the nib (24) within the tubular body (12, 14) from the second extended position to the first retracted position. In FIG. 1, such a spring may be located within tubular body (12, 14) and configured to cooperate with push button (18) to provide the axial translations of the nib (24) in the proximal and distal directions.

The writing instrument may further comprise a seal-assembly. The seal-assembly may comprise a seal component. The seal component may be located within the tubular body (12, 14) at or adjacent to the writing orifice. In FIG. 1, the seal component may be located within the tip component (14). The seal component may seal the nib (24) and the reservoir from exposure to the environment in the first retracted position. The seal component may be configured to be penetrated when the nib (24) is advanced into the second extended position for writing. In embodiments, the seal may be configured to be penetrated by the nib (24) itself. In embodiments, in particular when the nib (24) is made of a softer material, the seal may be configured to be penetrated by a piercing mechanism first. The term "penetrate" shall within this disclosure refer to a process wherein a first object is translated through a second object. During the penetration process the first object may translate through an already existing opening in the second object. Additionally or alternatively, the first object may form a new opening within previously continuous material of the second object during the penetration process.

The seal component may comprise a self-healing material. Self-healing materials (20) as such are known in the art and the self-healing materials (20) of the present disclosure are to be understood as the term is conventionally used in the art. The self-healing material (20) may be torn when the seal component is penetrated, which leads to the self-healing material (20) subsequently comprising a tear. The term "torn" within this application shall refer to a state, wherein a material that was previously continuous has at least one area where it is not continuous after tearing. The term "continuous material" shall refer to a material wherein there is no significant void in the material, in particular on a molecular level, aside from those voids commonly present in such a material, such as intramolecular spaces or defects commonly observed in a specific material. Additionally or alternatively, self-healing materials (20) may be characterized by their ability to at least partially close the tear, in particular on a molecular level. In embodiments, the closure of a tear on a molecular level may comprise the formation of new covalent bonds and/or the formation of multiple hydrogen bridges per molecule, the formation of salt bridges, supramolecular interactions, thermoreversible reaction, metal-ligand disassociation and association interactions, formation of reversible disulfide bonds or combinations of the aforementioned reactions and interactions.

Figure 3:
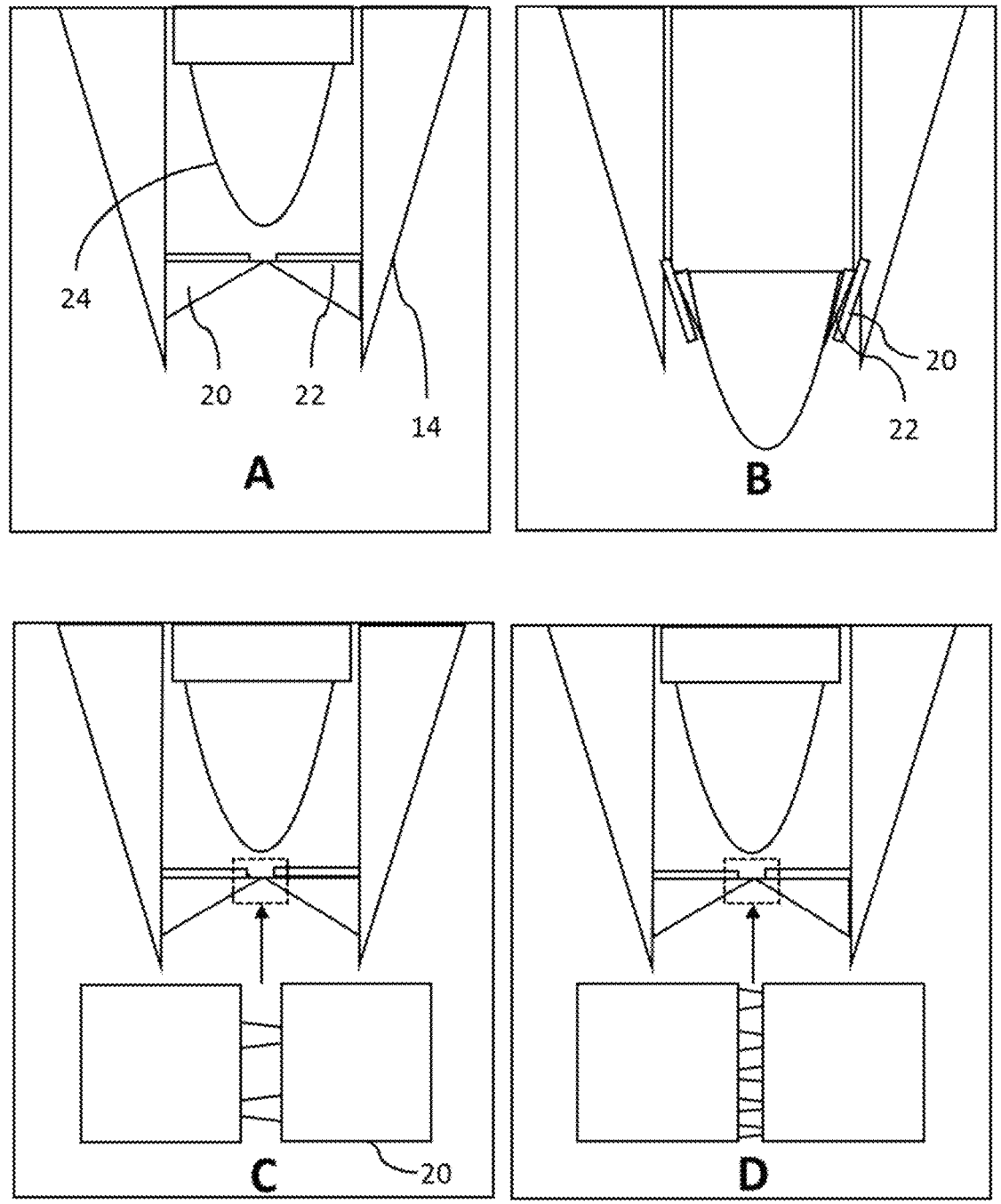
FIG. 3 shows an example of a penetration of the nib through the sealing-assembly.

FIG. 3A depicts an example of a seal-assembly before the penetration. FIG. 3B shows the seal-assembly when the nib (24) is in its extended position. FIG. 3C shows the self-healing seal starting to close the tear following the penetration by the nib (24), which is shown in the retracted position. FIG. 3D shows the self-healing in an advanced state of closing the tear following penetration by the nib (24), which is shown in the retracted position.

Additionally or alternatively, self-healing materials (20) may be characterized by their ability to at least partially repair damage inflicted to the material by the tearing. Additionally or alternatively, self-healing materials (20) may be characterized by their ability to at least partially repair damage inflicted to the material by the tearing on a molecular level. In embodiments, the repair on a molecular level may comprise the formation of new covalent bonds and/or the formation of multiple hydrogen bridges per molecule, the formation of salt bridges, supramolecular interactions, thermoreversible reaction, metal-ligand disassociation and association interactions, formation of reversible disulfide bonds or combinations of the aforementioned reactions and interactions.

The seal assembly may comprise at least one elastomeric support (22). The at least one elastomeric support (22) may be configured to prevent dragging of the self-healing material (20) during the nib (24) movement. The at least one elastomeric support (22) may prevent the dragging of the self-healing material (20) by preventing or reducing the attachment of the self-healing material (20) to the nib (24) during the penetration. The elastomeric support (22) may prevent or reduce the attachment of the self-healing material (20) to the nib (24) by acting as a non-adhesive layer between the nib (24) and the self-healing material (20).

In embodiments, the self-healing material (20) may be placed adjacent to at least one of the at least one elastomeric supports (22). Placement of the self-healing material (20) adjacent to at least one elastomeric support (22) may stabilize the self-healing seal. Additionally or alternatively, placement of at least one elastomeric support (22) adjacent to the self-healing material (20) may also provide a restoring force upon the self-healing material (20) when the nib (24) is retracted from its second position to its first position. The restoring force may force the self-healing material back to its initial position. Additionally or alternatively, the restoring force may force the self-healing material back to its initial geometry.

Figure 4:
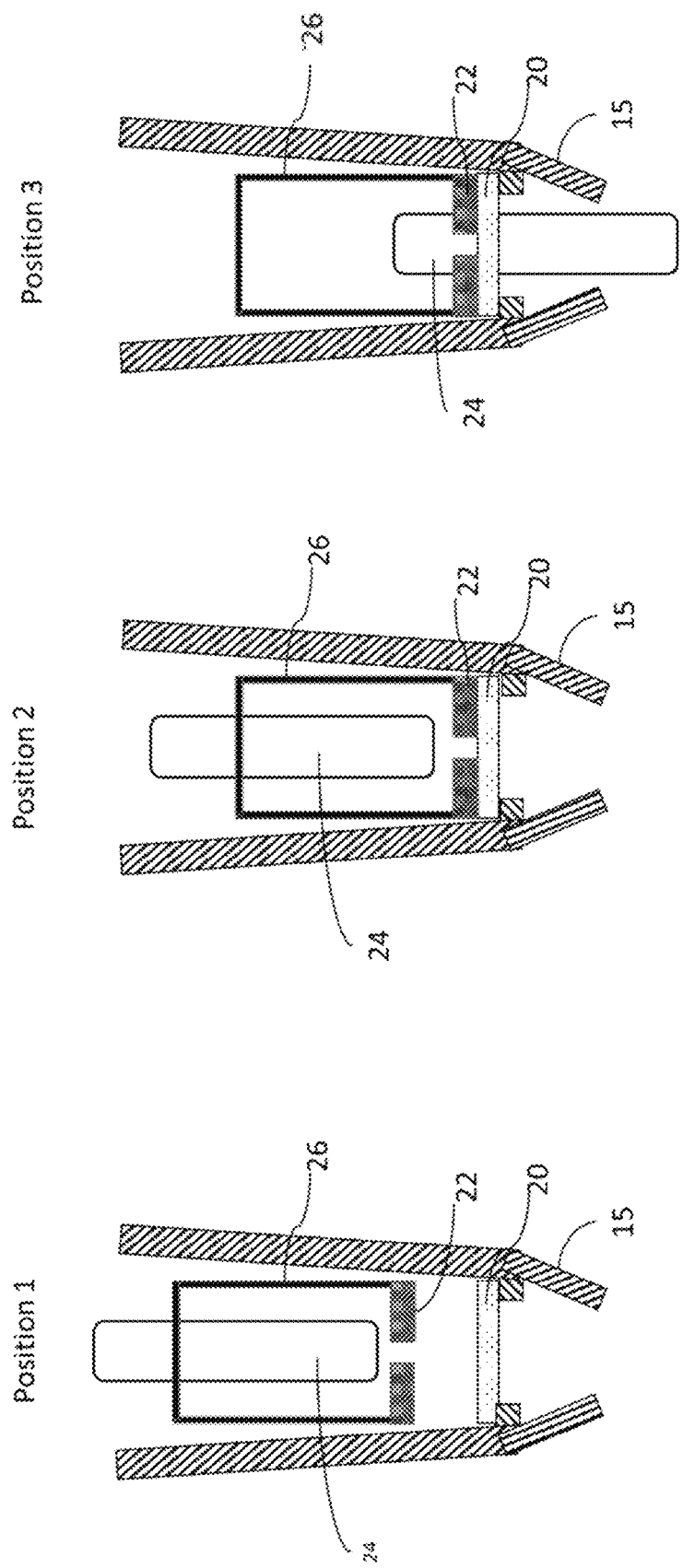
FIG. 4 shows an exemplary embodiment of a translatable elastomeric support.

In embodiments, at least one of the at least one elastomeric supports (22) may be placed distally of the nib (24) in the first retracted position and axially translate simultaneously with the nib (24) when the nib (24) is advanced into the second extended position for writing, until the at least one elastomeric support (22) is adjacent to the seal component. In embodiments, the actuating means for axially translating the nib (24) within the tubular body (12, 14) between the first retracted position and the second extended position may also actuate at least one of the at least one elastomeric supports (22). The elastomeric support (22) may be attached to a support holder (26) which is connected to the actuating means for axially translating the nib (24) within the tubular body (12, 14). In embodiments, it may be particularly advantageous that the writing instrument comprises an axially translatable elastomeric support (22) configured to stop its movement into the distal direction prior to the nib (24) reaching the second extended position. In particular, it may be particularly advantageous that the writing instrument comprises an axially translatable elastomeric support (22) configured to stop its movement into the distal direction prior to the nib (24) when reaching a position proximally adjacent to the self-healing material (20). The latter feature ensures that the elastomeric support (22) does not push through the self-healing material (20), which may damage the self-healing material (20). The stop can, for example, be implemented by providing the actuating means with a stop element which is blocks further axial advancement of the at least one elastomeric support (22) after reaching a position proximally adjacent to the self-healing material (20). FIG. 4 is a visualization of an elastomeric support (22) which axially translates simultaneously with the nib (24).

In embodiments, at least one of the at least one elastomeric supports (22) may have a thickness between about 0.1 mm to about 3 mm, more specifically between about 0.2 mm to about 2 mm and in particular between about 0.4 mm and about 1 mm. An elastomeric support (22) with a too low thickness may not be stable enough to prevent the dragging of the self-healing film. On the other hand, an elastomeric support (22) with an excessive thickness may not be sufficiently flexible for the nib (24) to penetrate.

In embodiments, at least one of the at least one elastomeric supports (22) may have a shore A hardness between about 30 to about 90, more specifically between about 40 to about 80, and in particular between about 50 to about 70, measured according to ASTM D2240-15e1. An elastomeric support (22) with a too low hardness may not be stable enough to prevent the dragging of the self-healing film. On the other hand, an elastomeric support (22) with an excessively high hardness may not be sufficiently flexible for the nib (24) to penetrate.

In embodiments, at least one of the at least one elastomeric supports (22) may cover at least about 70%, more specifically at least about 80% and in particular at least about 90% of the surface area of at least one side of the self-healing material (20) when the at least one elastomeric support (22) is in a position adjacent to the self-healing material (20) and the self-healing material (20) is its rest position.

In embodiments, at least one of the at least one elastomeric supports (22) may comprise one or more predetermined breaking points or lines. Predetermined breaking points or lines, may allow the nib (24) or piercing mechanism to more easily penetrate the elastomeric support (22).

In embodiments, at least one of the at least one elastomeric supports (22) may comprise the one or more predetermined breaking points or lines in the form of a slot by a single straight or curved line.

The term "slots" within the present disclosure shall refer to both incisions and recesses. The term "incision" relates to a line or curve across which an otherwise continuous material is not continuous. The edges of the incision may be in contact in a rest position. An incision can be approximated as being a 2-dimensional void. Transmission of force across the line or curve is not or only limitedly possible, except in a direction that is perpendicular to the line and in the plane of the continuous material. The not or only limitedly possible transmission of force across the line of curve may allow the two sides of the incision to move relatively independently from one another. An elastomeric support (22) comprising an incision may protect the self-healing material (20) from attachment to the nib (24). The at least one elastomeric support (22) does not seal the reservoir from exposure to the environment.

The term "recess" relates to a line or curve across which an otherwise continuous material is not continuous, and the edges of the recess are not in contact in the rest position. A recess is a 3-dimensional void. Transmission of force across the line or curve of the recess is not or only limitedly possible. The not or only limitedly possible transmission of force across the line or curve may allow the two sides of the recess to move relatively independently from one another. An elastomeric support (22) comprising a recess may prevent the self-healing material (20) moving into the slot due to capillary effects.

In embodiments, at least one of the at least one elastomeric supports (22) may comprise the one or more predetermined breaking points or lines in the form of slots by multiple straight or curved lines, in particular multiple intersecting straight or curved lines. Slots created by multiple straight curved lines, in particular multiple intersecting straight or curved lines, may require less force to be penetrate by the nib (24) or the piercing mechanism. An elastomeric support comprising a single slot may provide an improved restoring force compared to an elastomeric support comprising multiple slots.

The aforementioned sides of the at least one elastomeric supports may also be referred to as leaflets (24). An elastomeric support may comprise two, three or more leaflets (24). In particular, in this context, and also elsewhere, the term "leaflet" can be interpreted as a flap. The two, three or more leaflets may be adjacent to each other when the elastomeric support comprises incisions. Additionally or alternatively, the two, three or more leaflets may exhibit a void between them when the elastomeric support comprises recesses. Each leaflet may provide a restoring force to self-healing material adjacent to it.

Figure 2:
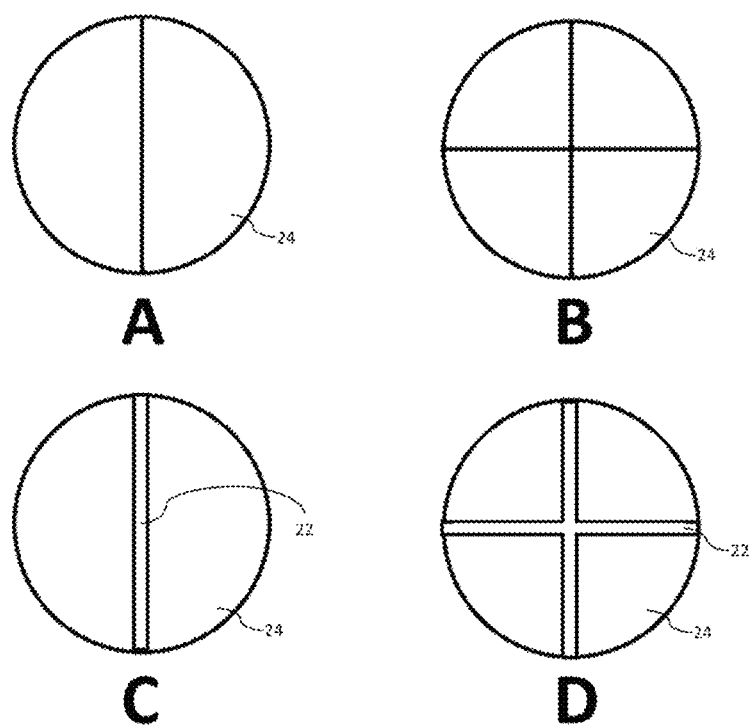
FIG. 2 shows examples of elastomeric supports comprising slots.

FIG. 2 illustrates different types of incisions and recesses in an elastomeric support (22). FIG. 2A shows a single line incision forming two leaflets (24). FIG. 2B shows two intersecting incisions forming four leaflets (24). FIG. 2C shows a single line recess forming two leaflets (24). FIG. 2D shows two intersecting recesses forming four leaflets (24). Two intersecting recesses may also be viewed as a single recesses with for example a cross-shape.

In embodiments, the seal-assembly may comprise two elastomeric supports (22), wherein the self-healing material (20) is placed between the two elastomeric supports (22), in particular wherein the self-healing material (20) is placed between the two elastomeric supports (22) along a proximal-distal axis. The proximal-distal axis refers to the axis between the proximal and distal end of the writing instrument. Placing the self-healing material (20) between two elastomeric supports (22) in a "sandwich"-like structure may stabilize the self-healing material (20) equally during extension and retraction of the nib (24). Placing the self-healing material (20) between two elastomeric supports (22) may prevent dragging during both extension and retraction of the nib (24). In embodiments one of the elastomeric supports (22) may be placed adjacent to the self-healing material (20) and another elastomeric support (22) may be configured to axially translate simultaneously with the nib (24).

In embodiments, at least one of the at the one elastomeric supports (22) may comprise a thermoplastic or a thermosetting elastomer, in particular one of styrenic block copolymers, thermoplastic polyolefineelastomers, thermoplastic polyurethanes, copolyesters, polyether block amides, thermoplastic vulcanizates or a silicone.

Elastomeric supports (22) comprising thermoplastic elastomers may be easier and cheaper to manufacture. Further, elastomeric supports (22) comprising thermoplastic elastomers may recyclable which may be beneficial when used in mass products with a limited lifetime, for example felt pens. Thermosetting elastomers, in particular silicones, may be more durable compared to thermoplastic elastomers and more inert, in particular inert against solvents of inks.

In embodiments, the self-healing material (20) may be configured to be at least partially torn when the nib (24) is advanced into the second extended position and to substantially close the tear by forming a continuous material when the nib (24) is retracted to the first retracted position. In embodiments, the self-healing material (20) may form the continuous material by forming molecular bonds, in particular molecular bonds across the tear.

In embodiments, the seal-assembly may be torn by the nib (24) or by the piercing mechanism when the nib (24) is advanced into the second extended position for writing. In embodiments, the seal component may be torn by the nib (24) or by the piercing mechanism when the nib (24) is advanced into the second extended position for writing. In embodiments, the actuating means for axially translating the nib (24) within the tubular body (12, 14) between the first retracted position and the second extended position may also actuate the piercing mechanism. In embodiments, it may be particularly advantageous that the writing instrument comprises a tubular piercing mechanism which is arranged radially outward of the nib (24), which is actuated together with the nib (24), which is configured to pierce the seal component before the nib (24) contacts the seal component and which is configured to stop its movement into the distal direction prior to the nib (24) reaching the second extended position. The latter feature ensures that the piercing mechanism does not impede writing with the nib (24). It can, for example, be implemented by providing the actuating means with a stop element which is blocks further axial advancement of the piercing mechanism after having pierced the seal.

In embodiments, the seal component may be configured to at least partially restore its sealing property in less than about 12 hours, more specifically less than about 6 hours, and in particular less than about 3 hours. In embodiments, it may be advantageous that the seal component is configured to close at least about 70%, specifically at least about 80%, more specifically at least about 90%, and in particular at least about 95% or all of the tear in less than about 12 hours, more specifically less than about 6 hours, and in particular less than about 3 hours.

It should be understood that a tear may be considered as substantially closed when the sealing property of the seal component is regained to such an extent that the drying out of the writing instrument (10) is prevented for a timespan that corresponds to the typical period of use of the writing instrument (10), for instance about 1 month, about 3 months, or about 6 months, under typical storage conditions, such as about 25° C. at about 40% relative humidity. Additionally or alternatively, a tear may be considered as substantially closed when the sealing property of the seal component is regained to such an extent that the time for drying out of the writing instrument (10) is prolonged by a factor of at least about 5, specifically at least about 10, more specifically at least about 15, and in particular at least about 20, in comparison to the same writing instrument in which the nib (24) is kept in the second extended position under otherwise identical storage conditions (e.g., about 25° C. at about 40% relative humidity). The time span until the writing instrument (10) is dried out may be determined by any suitable means. One example may be the loss of the writing instrument's (10) ability to write an uninterrupted clean line.

Writing instruments such as felt pens commonly comprise nibs (24) made of fibrous or porous material. The nib (24) may be made of a polymer, e.g. a thermoplastic or thermosetting polymer, or a felt. The polymer may be a rigid polymer or an elastomer. The nib (24) may comprise polymer fibers. The nib (24) may comprise a sintered polymer powder.

However, these fibrous or porous materials may be especially prone to damage by drying out. The nibs (24) are typically saturated with ink. If the solvents of the ink evaporate, the pores or channels in the nib (24) configured to transport ink from the reservoir to a surface of a nib (24) intended for writing may become blocked by substances previously solved in the solvents. This blockage may be irreversible. Further, nibs (24) made from fibrous or porous materials, in particular those with porous surfaces, may have a stronger interaction with the self-healing material (20), compared to smooth materials. As a result, for nibs (24) made of fibrous or porous materials it may be advantageous to provide at least one elastomeric support configured to prevent dragging of the self-healing material during the nib (24) movement.

The selection of the self-healing material (20) is not particularly limited. Self-healing materials (20) may be primarily categorized as extrinsic and intrinsic. Four different types of self-healing materials (20) are generally known in the art for: (a) encapsulation of reactive monomers that are released after a rupture. The reactive monomers may also be stored in other internal compartments such as rods or veins running through the polymer. Such materials are called extrinsic self-healing materials (20). Example materials for use in extrinsic self-healing compounds are Poly(dimethylsiloxane) (PDMS), epoxy resin, epoxy vinyl ether, poly(methyl methacrylate) (PMMA), polystyrene. (b) The formation of new irreversibly covalent bonds in the damaged area, (c) supramolecular self-assembly, and (d) the formation of reversible covalent bonds in the material. The latter three types are called intrinsic self-healing materials (20). Example materials for use as intrinsic self-healing compounds are polyurethanes and polyureas. In embodiments, the self-healing material (20) may be selected from intrinsic self-healing materials (20) or extrinsic self-healing materials (20).

In embodiments, it may be advantageous that the self-healing material (20) may be selected from intrinsic self-healing materials (20) comprising functional groups capable of forming reversible covalent bonds during the self-healing. In embodiments, the self-healing material (20) may be a crosslinked thermoplastic polymer comprising functional groups capable of forming reversible covalent bonds during the self-healing, in particular at room temperature.

In embodiments, it may be particularly advantageous that the self-healing material (20) comprises a polyurethane comprising disulfide bridges or a polydisulfide, wherein self-healing involves formation of new disulfide bridges in the polymer. This polyurethane material comprising disulfide bridges is an example of intrinsic self-healing material (20) belonging to the aforementioned category (d), as the healing mechanism relies on the reversible creation of covalent bonds in the material.

In embodiments the crosslinked thermoplastic polymer is a poly(urea-urethane), wherein self-healing involves formation of new disulfide bridges in the polymer. In embodiments the crosslinked thermoplastic polymer is a thiol-based polymer, wherein self-healing involves formation of new disulfide bridges in the polymer.

In embodiments, the self-healing material (20) may comprise a reversible bond-based polymer. Reversible bond-based polymers may revert to the initial state whether it is monomeric, oligomeric, or non-cross-linked. Reversible bond-based polymers may be stable under normal condition, the reversible process usually requires an external stimulus for it to occur, e.g. mechanical force. A reversible bond-based polymer may heal to its polymer after being damaged by means such as tearing and reverted to its constituents, under the conditions used to polymerize it. In embodiments, the reversible bond-based polymer may polymerize at room temperature.

In embodiments, the self-healing material (20) may comprise a Diels-Alder reaction-based polymer. In embodiments the Diels-Alder reaction-based polymer may comprise furan and/or maleimide functional groups. The furan and/or maleimide functional groups may be configured to form carbon-carbon bonds, in particular via a cycloaddition route.

In embodiments, the self-healing material (20) may comprise an ureidopyrimidone modified polymer. These polymers are already described for example in U.S. Pat. No. 9,006,364B2 or 6,803,447B2, which are both incorporated herewith in its entirety. The ureidopyrimidone modified polymer may be configured to heal by forming hydrogen bonds.

In embodiments, the writing instrument may be a felt pen, a highlighter, or a permanent or non-permanent marker.

In embodiments, the seal component may fulfill its function for at least 200 cycles, more specifically at least 1000 cycles and in particular at least 2000 cycles.

In embodiments, the seal component may be disc-shaped. In embodiments, at least one of the at least one elastomeric supports (22) may be disc-shaped. In examples the shape of the at least one elastomeric support (22) and/or the seal component may be curved. In embodiments, wherein the seal component may be bell-shaped. In embodiments, at least one of the at least one elastomeric supports (22) may be bell-shaped. It may be beneficial that the seal component and the elastomeric supports (22) have the same shape to align their surfaces which may improve their synergistic function of self-healing and.

Although the preferred embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

Aspects

The present application furthermore relates to the following aspects.

1. A writing instrument comprising:
    a tubular body terminating in a writing orifice at the distal end of the tubular body;
    a reservoir for storing a writing ink which is arranged proximally to the writing orifice;
    a nib arranged distally to the reservoir and in fluid communication with the reservoir,
    wherein the nib is configured to be axially translatable within the tubular body between a first retracted position in which the nib is positioned within the tubular body and not protruding through the writing orifice and a second extended position in which the nib protrudes through the writing orifice; an actuating means for axially translating the nib within the tubular body between the first retracted position and the second extended position for writing;
    a seal assembly comprising:
    a seal component located within the tubular body at or adjacent to the writing orifice which seals the nib and the reservoir from exposure to the environment in the first retracted position,
    wherein the seal component is configured to be penetrated when the nib is advanced into the second extended position for writing,
    wherein the seal component comprises a self-healing material,
    and wherein the seal component is configured to at least partially restore its sealing property when the nib is retracted to the first retracted position;
    wherein the seal-assembly further comprises at least one elastomeric support configured to prevent dragging of the self-healing material during the nib movement.
2. The writing instrument according to aspect 1, wherein the self-healing material is placed adjacent to at least one of the at least one elastomeric supports.
3. The writing instrument according to any preceding aspect, wherein at least one of the at least one elastomeric supports is placed distally of the nib in the first retracted position and axially translates simultaneously with the nib when the nib is advanced into the second extended position for writing, until the at least one elastomeric support is adjacent to the seal component.
4. The writing instrument according to any preceding aspect, wherein at least one of the at least one elastomeric supports has a thickness between about 0.1 mm to about 3 mm, more specifically between about 0.2 mm to about 2 mm and in particular between about 0.4 mm and about 1 mm.
5. The writing instrument according to any preceding aspect, wherein at least one of the at least one elastomeric supports has a shore A hardness between about 30 to about 90, more specifically between about 40 to about 80, and in particular between about 50 to about 70, measured according to ASTM D2240-15e1.
6. The writing instrument according to any preceding aspect, wherein at least one of the at least one elastomeric supports covers at least about 70%, more specifically at least about 80% and in particular at least about 90% of the surface area of at least one side of the self-healing material when the at least one elastomeric support is in a position adjacent to the self-healing material.
7. The writing instrument according to any preceding aspect, wherein at least one of the at least one elastomeric supports comprises one or more predetermined breaking points or lines.
8. The writing instrument according to aspect 7, wherein at least one of the at least one elastomeric supports comprises the one or more predetermined breaking points or lines in the form of a slot by a single straight or curved line.
9. The writing instrument according to aspect 8, wherein at least one of the at least one elastomeric supports comprises the one or more predetermined breaking points or lines in the form of slots by multiple straight or curved lines, in particular multiple intersecting straight or curved lines.
10. The writing instrument according to any preceding aspect, wherein the seal-assembly comprises two elastomeric supports, wherein the self-healing material is placed between the two elastomeric supports, in particular wherein the self-healing material is placed between the two elastomeric supports along a proximal-distal axis.
11. The writing instrument according to any preceding aspect, wherein at least one of the at the one elastomeric supports comprises a thermoplastic or a thermosetting elastomer, in particular one of styrenic block copolymers, thermoplastic polyolefineelastomers, thermoplastic polyurethanes, copolyesters, polyether block amides, thermoplastic vulcanizates or a silicone.

12. The writing instrument of any preceding aspect, wherein the self-healing material is configured to be at least partially torn when the nib is advanced into the second extended position and to substantially close the tear by forming a continuous material when the nib is retracted to the first retracted position.

13. The writing instrument according to any preceding aspect, wherein the seal component is torn by the nib or by a piercing mechanism when the nib is advanced into the second extended position for writing.

14. The writing instrument according to aspect 12 or 13, wherein the self-healing material forms the continuous material by forming molecular bonds, in particular molecular bonds across the tear.

15. The writing instrument according to any preceding aspect, wherein the seal component is configured to at least partially restore its sealing property in less than about 12 hours, more specifically less than about 6 hours, and in particular less than about 3 hours.

16. The writing instrument according to any preceding aspect, wherein the nib is made of a fibrous or porous material.

17. The writing instrument according to any preceding aspect, wherein the self-healing material is selected from intrinsic self-healing materials or extrinsic self-healing materials.

18. The writing instrument according to any preceding aspect, wherein the writing instrument is a felt pen, a highlighter, or a permanent or non-permanent marker.

19. The writing instrument according to any preceding aspect, wherein the seal component fulfills its function for at least 200 cycles, more specifically at least 1000 cycles and in particular at least 2000 cycles.

20. The writing instrument according to any preceding aspect, wherein the seal component is disc-shaped.

21. The writing instrument according to any preceding aspect, wherein at least one of the at least one elastomeric supports is disc-shaped.

22. The writing instrument according any one of aspects 1 to 19 or aspect 21, wherein the seal component is bell-shaped.

23. The writing instrument according to any one of aspects 1 to 20 or aspect 22, wherein at least one of the at least one elastomeric supports is bell-shaped.

The invention claimed is:

1. A writing instrument comprising:
a tubular body terminating in a writing orifice at a distal end of the tubular body;
a reservoir for storing a writing ink which is arranged proximally to the writing orifice;
a nib arranged distally to the reservoir and in fluid communication with the reservoir,
wherein the nib is configured to be axially translatable within the tubular body between a first retracted position in which the nib is positioned within the tubular body and not protruding through the writing orifice and a second extended position in which the nib protrudes through the writing orifice;
an actuating means for axially translating the nib within the tubular body between the first retracted position and the second extended position for writing;
a seal assembly comprising:
a seal component located within the tubular body at or adjacent to the writing orifice which seals the nib and the reservoir from exposure to the environment in the first retracted position,
wherein the seal component is configured to be penetrated when the nib is advanced into the second extended position for writing,
wherein the seal component comprises a self-healing material,
and wherein the seal component is configured to at least partially restore its sealing property when the nib is retracted to the first retracted position;
wherein the seal-assembly further comprises at least one elastomeric support configured to prevent dragging of the self-healing material during the nib movement.

2. The writing instrument according to claim 1, wherein the self-healing material is placed adjacent to at least one of the at least one elastomeric supports.

3. The writing instrument according to claim 1, wherein at least one of the at least one elastomeric supports is placed distally of the nib in the first retracted position and axially translates simultaneously with the nib when the nib is advanced into the second extended position for writing, until the at least one elastomeric support is adjacent to the seal component.

4. The writing instrument according to claim 1, wherein at least one of the at least one elastomeric supports has a thickness between about 0.1 mm to about 3 mm.

5. The writing instrument according to claim 1, wherein at least one of the at least one elastomeric supports has a shore A hardness between about 30 to about 90, measured according to ASTM D2240-15e1.

6. The writing instrument according to claim 1, wherein at least one of the at least one elastomeric supports covers at least about 70% of the surface area of at least one side of the self-healing material when the at least one elastomeric support is in a position adjacent to the self-healing material.

7. The writing instrument according to claim 1, wherein at least one of the at least one elastomeric supports comprises one or more predetermined breaking points or lines in the form of a slot by a single straight or curved line.

8. The writing instrument according to claim 7, wherein at least one of the at least one elastomeric supports comprises the one or more predetermined breaking points or lines in the form of slots by multiple straight or curved lines.

9. The writing instrument according to claim 1, wherein the seal-assembly comprises two elastomeric supports, wherein the self-healing material is placed between the two elastomeric supports.

10. The writing instrument according to claim 9, wherein the self-healing material is placed between the two elastomeric supports along a proximal-distal axis.

11. The writing instrument of claim 1, wherein the self-healing material is configured to be at least partially torn when the nib is advanced into the second extended position and to substantially close the tear by forming a continuous material when the nib is retracted to the first retracted position.

12. The writing instrument of claim 11, wherein the seal component is torn by the nib or by a piercing mechanism when the nib is advanced into the second extended position for writing.

13. The writing instrument according to claim 11, wherein the self-healing material forms the continuous material by forming molecular bonds.

14. The writing instrument according to claim 13, wherein the self-healing material forms the continuous material by forming molecular bonds across the tear.

15. The writing instrument according to claim 1, wherein the seal component is configured to at least partially restore its sealing property in less than about 12 hours.

16. The writing instrument according to claim 1, wherein the nib is made of a fibrous or porous material.

17. The writing instrument according to claim 1, wherein the self-healing material is selected from intrinsic self-healing materials or extrinsic self-healing materials.

18. The writing instrument according to claim 1, wherein the writing instrument is a felt pen, a highlighter, or a permanent or non-permanent marker.

19. The writing instrument according to claim 1, wherein the seal component is disc-shaped.

20. The writing instrument according to claim 1, wherein at least one of the at least one elastomeric supports is disc-shaped.

* * * * *